(12) United States Patent
Hsi

(10) Patent No.: US 7,609,177 B2
(45) Date of Patent: Oct. 27, 2009

(54) STORAGE MEDIA CONTAINING ELECTRONIC MAP FILE, ELECTRONIC MAP DISPLAY SYSTEM UTILIZING ELECTRONIC MAP FILE AND RELATED METHOD THEREOF

(75) Inventor: Chen-Ning Hsi, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 304 days.

(21) Appl. No.: 11/752,247

(22) Filed: May 22, 2007

(65) Prior Publication Data

US 2008/0111665 A1    May 15, 2008

(30) Foreign Application Priority Data

Nov. 15, 2006    (TW) .............................. 95142184 A

(51) Int. Cl.
G08G 1/123    (2006.01)
(52) U.S. Cl. ............................. 340/995.14; 340/995.18; 701/208

(58) Field of Classification Search ............ 340/995.14, 340/995.18, 995.19, 990; 701/208, 209, 701/211, 212
See application file for complete search history.

(56) References Cited

U.S. PATENT DOCUMENTS

| | | | | |
|---|---|---|---|---|
| 4,847,788 | A * | 7/1989 | Shimada | 340/995.18 |
| 5,742,924 | A * | 4/1998 | Nakayama | 701/208 |
| 5,748,109 | A * | 5/1998 | Kosaka et al. | 340/995.14 |
| 5,945,927 | A * | 8/1999 | Nakayama et al. | 340/995.14 |
| 6,144,318 | A * | 11/2000 | Hayashi et al. | 340/990 |
| 6,434,481 | B2 * | 8/2002 | Winter et al. | 701/208 |
| 7,519,469 | B2 * | 4/2009 | de Silva et al. | 701/208 |
| 2003/0208316 | A1 * | 11/2003 | Endo et al. | 701/211 |

* cited by examiner

Primary Examiner—John A Tweel, Jr.
(74) Attorney, Agent, or Firm—Winston Hsu

(57) ABSTRACT

An electronic map display method is disclosed. The method includes: providing an electronic map file having a plurality of objects where each object has an attribute; and comparing a plurality of attributes corresponding to a plurality of target objects included within a display range to control a display order with respect to the target objects for displaying the target objects.

20 Claims, 2 Drawing Sheets

STORAGE MEDIA CONTAINING ELECTRONIC MAP FILE, ELECTRONIC MAP DISPLAY SYSTEM UTILIZING ELECTRONIC MAP FILE AND RELATED METHOD THEREOF

BACKGROUND OF THE INVENTION

1. Field of the Invention

The present invention relates to a scheme for displaying an electronic map, and more particularly, to an electronic map display system and related method for using a plurality of attributes corresponding to a plurality of target objects to control a display order regarding the target objects for displaying the target objects.

2. Description of the Prior Art

Generally speaking, if a person is at an unfamiliar location in a particular geographic environment, he/she can use an electronic map display system to find an important landmark nearby. This person must find his/her relative position (corresponding to his/her current unfamiliar location) on an electronic map to determine the general direction in which to proceed in order to arrive at the next location. At present, when using a conventional electronic map display system (e.g. a vehicle navigation system) to display a smaller section of the electronic map (e.g. corresponding to the unfamiliar location in the particular geographic environment mentioned above), a user can find his/her location relative to the particular geographic environment in two different ways. One way is to directly use a scrollbar on the display system to change a display range currently displayed on the screen. Although the idea of this method is simple and direct, the electronic map display system displays all target objects (corresponding to landmarks and included by an electronic map manufacturing company) within the display range each time the display range is changed. This will cause a delay in the display screen while all the target objects in the display range are redrawn each time the scrollbar is moved. Therefore, although using the scrollbar to change the display range for finding out the position is very simple, much time is wasted waiting for the new display range and target objects to be redrawn. Additionally, the other way to find his/her location relative to the particular geographic environment is to change a scale on the electronic map. That is, the user can change the scale to narrow the display range currently shown on the screen and to enlarge a range on the electronic map (i.e. zoom in for a "closer" view). Accordingly, the changed display range will comprise an enlarged display range on the electronic map on the display screen. However, since the scale is enlarged, the electronic map display system may selectively not display target object(s) having over-detailed information when displaying objects within the changed display range. For example, before enlarging the scale on the electronic map, the electronic map display system displays all target objects (e.g. it displays both an important road and a branch road on the display screen). After enlarging the scale, the electronic map display system may only display the important road without displaying the branch road on the display screen so that information viewed by the user is not overcrowded and a computing time delay required by the electronic map display system (for displaying object(s)) can be decreased. However, this makes it inconvenient for the user in finding his/her position on the electronic map, because unlike the experience of viewing a real map, the user must change the scale many times and can never immediately browse other positions on the electronic map but that are out of the display range. In summary, using such a conventional electronic map display system is inconvenient and requires multiple user actions to achieve a single task.

SUMMARY OF THE INVENTION

It is therefore one of the objects of the present invention to provide an electronic map display system and related method for comparing a plurality of attributes corresponding to a plurality of target objects to control a display order with respect to the target objects for displaying the target objects, in order to solve the above-mentioned problems.

According to an embodiment of the claimed invention, an electronic map display method is disclosed. The electronic map display method comprises: providing an electronic map file including a plurality of objects where each object has an attribute; and comparing a plurality of attributes corresponding to a plurality of target objects included within a display range to control a display order with respect to the target objects for displaying the target objects.

According to an embodiment of the claimed invention, a storage medium is disclosed. The storage medium stores an electronic map file, which comprises a plurality of objects where each object has a display priority.

According to an embodiment of the claimed invention, an electronic map display system is disclosed. The electronic map display system comprises a storage device and a processing device. The storage device is utilized for providing an electronic map file including a plurality of objects where each object has an attribute. The processing device is coupled to the storage device and utilized for comparing a plurality of attributes corresponding to a plurality of target objects included within a display range to control a display order with respect to the target objects for displaying the target objects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
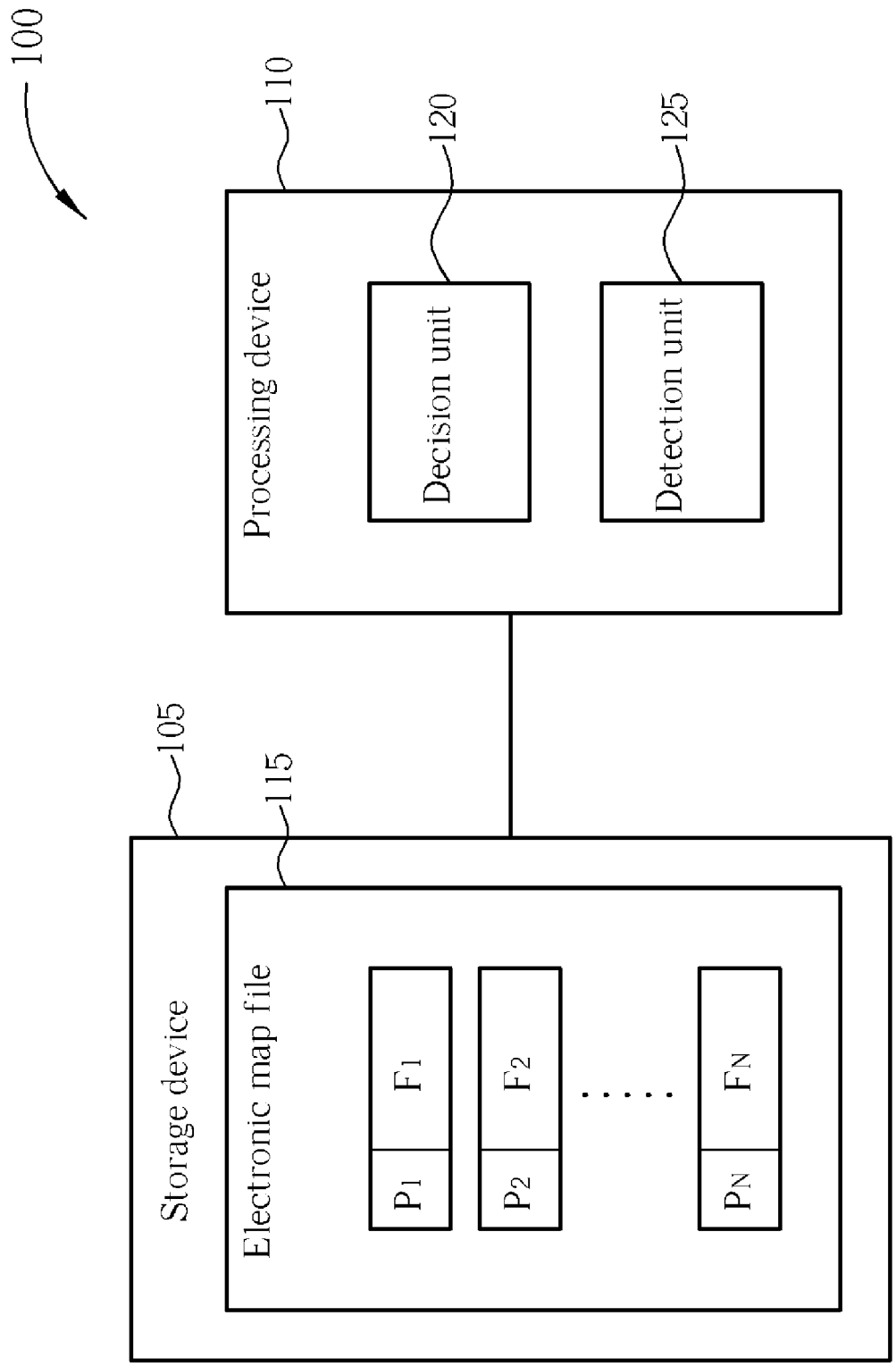
FIG. 1 is a diagram of an electronic map display system according to an embodiment of the present invention.

Please refer to FIG. 1. FIG. 1 is a diagram of an electronic map display system 100 according to an embodiment of the present invention. As shown in FIG. 1, the electronic map display system 100 includes a storage device 105 and a processing device 110. The storage device 105 is utilized for storing an electronic map file 115, which includes a plurality of objects $F_1$-$F_N$ having corresponding display priorities $P_1$-$P_N$ respectively. The processing device 110 includes a decision unit 120 and a detection unit 125; the processing device 110 is utilized for comparing a plurality of display priorities corresponding to a plurality of target objects included within a display range to control a display order for displaying the target objects. Please note that the objects $F_1$-$F_N$ are representatives of different landmarks (e.g. mountains, rivers, roads, buildings, etc.) on an actual map and the display range is meant to be a range of an electronic map capable of being displayed on a display screen of the electronic map display system 100. In this embodiment, a size of the display range is smaller than a total size of the range of the electronic map corresponding to the electronic map file 115. In addition, the objects $F_1$-$F_N$ are comprised by a plurality of anchor objects and a plurality of data objects, where each anchor object corresponds to a more important landmark on the actual map and each data object corresponds to a less important landmark on the actual map. For example, an anchor object can correspond to an important river or road. That is, the anchor object is used for a user to quickly find his/her general position on the map; and a data object can correspond to a local residence, a local store, or a building. In other words, the data object is used for the user to get more localized information regarding his/her location in this geographical environment. In general, categorizing the objects $F_1$-$F_N$ into anchor objects or data objects and setting the display priorities $P_1$-$P_N$ are achieved in advance by an electronic map manufacturing company. These can also be accomplished according to the user's habits, however, and therefore are not intended to be limitations of the present invention.

In this embodiment, it is assumed that the target objects included within the display range are comprised of the objects $F_1$-$F_4$ in the objects $F_1$-$F_N$, where objects $F_1$ and $F_2$ are data objects and objects $F_3$ and $F_4$ are anchor objects. It is also assumed that the display priority $P_2$ of data object $F_2$ is higher than that (i.e. $P_1$) of data object $F_1$, and that the display priority $P_4$ of anchor object $F_4$ is higher than that (i.e. $P_3$) of anchor object $F_3$. Based on this, the processing device 110 displays the objects $F_1$-$F_4$ according to priority order of the objects: $F_4$, $F_3$, $F_2$, and $F_1$. The anchor objects are displayed before data objects because anchor objects are more easily identified by the user (on the electronic map and in the environment) than data objects. Accordingly, the processing device 110 considers displaying all the anchor objects first, before displaying any remaining objects (i.e. data objects). A display order with respect to different anchor/data objects depends on their respective and relative display priorities; in an embodiment of the present invention, the display priority of each anchor object within a display range must be higher than that of each data object within the display range. As for all the anchor objects within the display range, the display order with respect to the anchor objects is determined according to corresponding display priorities of the anchor objects. Similarly, the display order of all the data objects within the display range is determined according to their respective and relative display priorities. It should be noted that the target objects comprised of the anchor objects and the data objects are one of examples and are only for illustrative purposes; this is not meant to be a limitation of the present invention. For instance, in other embodiments, the target objects can comprise only an anchor object and only a data object or can comprise only an anchor object and a plurality of data objects. Likewise, in another embodiment, the target objects can also be composed of only a data object and a plurality of anchor objects. The above-described display scheme can be applied to all these modifications to display a desired range of the electronic map.

In addition, the human eye requires time to sense displayed objects (e.g. the average person may need 1/30 of a second, but this varies from person to person). Therefore, the processing device 110 must control the display time of the display range to be longer than or equal to a predetermined time (e.g. the sensing time of the human eye) when displaying the above-mentioned target objects, additionally because the processing device 110 requires time to process the display of the target object(s). That is, even though the user may change the display range (e.g. move a range of the display screen from one map area to another) very rapidly, the processing device 110 still delays for at least the predetermined time before displaying the target objects; doing so avoids the likelihood that the display range is shown without any target objects displayed on it. If the display range were changed before target objects could be displayed, the user may never see a landmark corresponding to any target object during the rapid display range changes. Using the objects $F_1$-$F_4$ as an example, if the user continues changing the display range very rapidly, there is a possibility that the processing device 110 has received an update instruction for the display range and then changed the display range but the anchor object $F_4$ to be displayed first has not yet been viewed by the user. Therefore, the processing device 110 ignores any received instruction for updating the display range until the display time of the display range reaches the predetermined time (e.g. 1/30 seconds), in order to avoid the situation where the user may not have viewed any target objects. The processing device 110 allows changing the display range according to the above-mentioned received update instruction after the display time of the display range reaches the predetermined delay. Even though the user may only see anchor objects $F_4$ and $F_3$ (i.e. the data objects $F_2$ and $F_1$ may not be displayed) on the display during the predetermined time, this is still helpful for the user to find his/her position relative to anchor objects $F_4$ and $F_3$ on the electronic map.

Figure 2:
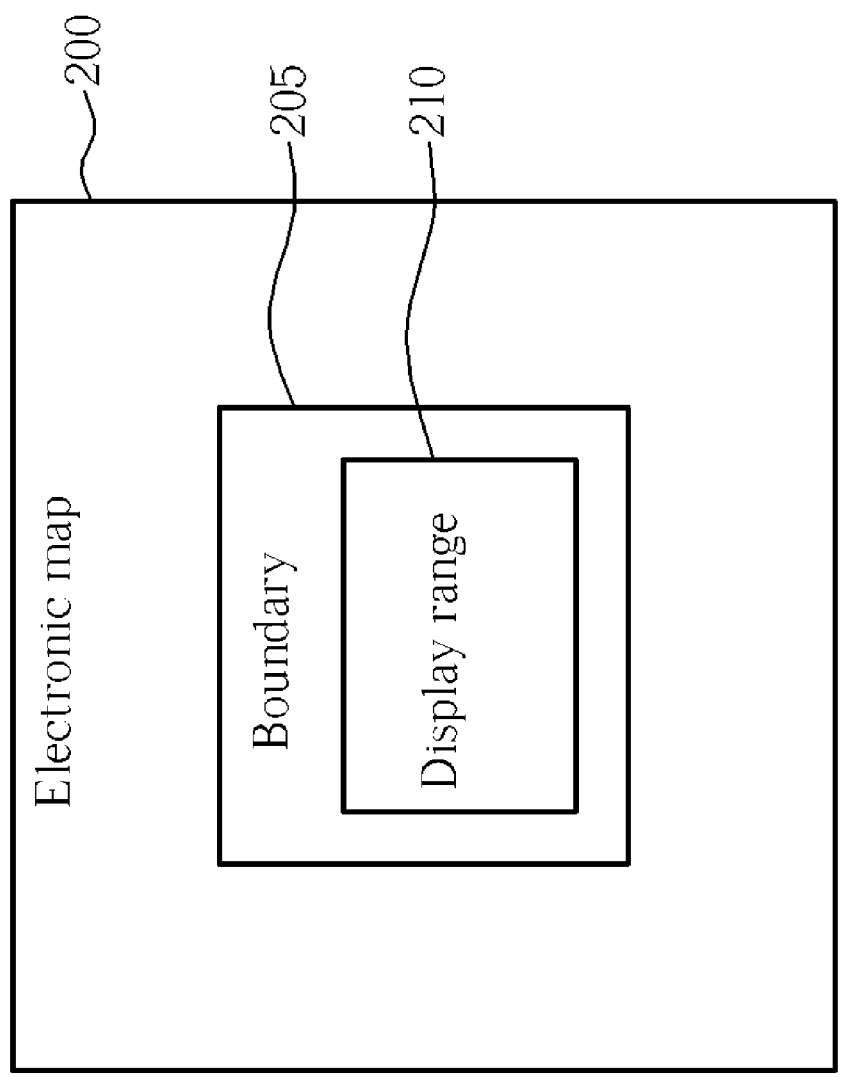
FIG. 2 is a diagram illustrating an operation of the processing device shown in FIG. 1.

In this embodiment, the above-mentioned scheme for controlling the display delay time of the display range is implemented by using the decision unit 120 and the detection unit 125. In particular, the decision unit 120 is utilized for determining a boundary corresponding to the display range according to the predetermined time, and the detection unit 125 is responsible for detecting whether the display range exceeds the boundary. The processing device 110 ignores any received update instruction before the display range exceeds the boundary. Please refer to FIG. 2. FIG. 2 is a diagram illustrating an operation of the processing device 110 shown in FIG. 1. As shown in FIG. 2, an electronic map 200 corresponds to the actual full map, and a boundary 205 is a boundary range corresponding to a display range 210 at present and is determined by the decision unit 120. Please note that the boundary range is not limited to be rectangular and this is only used for illustrative purposes. Before a display time of the display range 210 reaches the predetermined time, the processing device 110 displays a changed display range only when the display range 210 receives an update instruction so that the new display range strides across or exceeds the boundary 205. Otherwise, the processing device 110 will continue displaying objects within the display range 210 until the display time reaches the predetermined time. Since the user's habits may be affected by the size of boundary 205 while operating the processing device 110, the fastest speed at which instructions can be input by the user must also be considered when determining the size of boundary 205. For example, the size of the boundary 205 can be set as a longest distance which a user can move the display range 210 during the predetermined time; as a result, even if the user operates the processing device 110 incorrectly and the display range 210 is changed rapidly, the user will always be presented with a display screen where at least one target object have already been drawn. It should be noted that, in this embodiment, the decision unit 120 determines boundary 205 according to the predetermined time; in other embodiments, however, the boundary 205 can also be a fixed boundary range. Although it is inconvenient for some users to use a fixed boundary range, it also helps to solve the problem where the user may never see any objects when the display range 210 is changed very rapidly. This also obeys the spirit of the present invention.

In summary, an electronic map file stored in a storage medium (e.g. the storage device 105 shown in FIG. 1) includes a plurality of objects, where each object has a display priority. The objects comprise at least one anchor object and at least one data object, where a display priority corresponding to each anchor object is higher than that of each data object. Accordingly, through the teachings of the present invention, electronic map object designers can solve the problems of the prior art according to different display priorities of the anchor object and the data object.

Those skilled in the art will readily observe that numerous modifications and alterations of the device and method may be made while retaining the teachings of the invention.

What is claimed is:

1. An electronic map display method, comprising:
   providing an electronic map file including a plurality of objects, each object having an attribute; and
   comparing a plurality of attributes corresponding to a plurality of target objects included within a display range to control a display order with respect to the target objects for displaying the target objects, wherein the step of displaying the target objects comprises:
      controlling a display time of the display range to be longer than or equal to a predetermined time.

2. The method of claim 1, wherein the attribute is a display priority.

3. The method of claim 1, wherein the objects comprise at least an anchor object and at least a data object; the target objects comprise the anchor object and the data object; and the step of controlling the display order with respect to the target objects comprises:
   displaying the anchor object before displaying the data object.

4. The method of claim 3, wherein the objects comprise a plurality of anchor objects and the data object; the target objects comprise the anchor objects and the data object; and the step of controlling the display order with respect to the target objects further comprises:
   displaying the anchor objects before displaying the data object.

5. The method of claim 4, wherein the step of displaying the anchor objects comprises:
   controlling a display order with respect to the anchor objects according to a plurality of attributes respectively corresponding to the anchor objects.

6. The method of claim 3, wherein the objects comprise the anchor object and a plurality of data objects; the target objects comprise the anchor object and the data objects; and the step of controlling the display order with respect to the target objects further comprises:
   displaying the anchor object before displaying the data objects.

7. The method of claim 6, wherein the step of displaying the data objects comprises:
   controlling a display order with respect to the data objects according to a plurality of attributes respectively corresponding to the data objects.

8. The method of claim 1, wherein the step of controlling the display time of the display range to be longer than or equal to the predetermined time comprises:
   ignoring any received update instruction for the display range before the display time of the display range reaches the predetermined time.

9. The method of claim 1, wherein the step of controlling the display time of the display range to be longer than or equal to the predetermined time comprises:
   determining a boundary corresponding to the display range according to the predetermined time;
   detecting whether the display range exceeds the boundary; and
   ignoring any received update instruction for the display range before the display range exceeds the boundary.

10. An electronic map display method, comprising:
    providing an electronic map file including a plurality of objects, each object having an attribute; and
    comparing a plurality of attributes corresponding to a plurality of target objects included within a display range to control a display order with respect to the target objects for displaying the target objects, wherein the step of displaying the target objects comprises:
       setting a boundary corresponding to the display range;
       detecting whether the display range exceeds the boundary; and
       ignoring any received update instruction for the display range before the display range exceeds the boundary.

11. An electronic map display system, comprising:
    a storage device, for providing an electronic map file including a plurality of objects, each having an attribute; and
    a processing device, coupled to the storage device, for comparing a plurality of attributes corresponding to a plurality of target objects included within a display range to control a display order with respect to the target objects for displaying the target objects, wherein the processing device controls a display time of the display range to be longer than or equal to a predetermined time for displaying the target objects.

12. The electronic map display system of claim 11, wherein the attribute is a display priority.

13. The electronic map display system of claim 11, wherein the objects comprise at least an anchor object and at least a data object; the target objects comprise the anchor object and the data object; and the processing device displays the anchor object before displaying the data object.

14. The electronic map display system of claim 13, wherein the objects comprise a plurality of anchor objects and the data object; the target objects comprise the anchor objects and the data object; and the processing device displays the anchor objects before displaying the data object.

15. The electronic map display system of claim 14, wherein the processing device controls a display order with respect to the anchor objects according to a plurality of attributes respectively corresponding to the anchor objects.

16. The electronic map display system of claim 13, wherein the objects comprise the anchor object and a plurality of data objects; the target objects comprise the anchor object and the data objects; and the processing device displays the anchor object before displaying the data objects.

17. The electronic map display system of claim 16, wherein the processing device controls a display order with respect to the data objects to display the data objects according to a plurality of attributes corresponding to the data objects.

18. The electronic map display system of claim 11, wherein the processing device ignores any received update instruction for the display range before the display time of the display range reaches the predetermined time.

19. The electronic map display system of claim 11, wherein the processing device comprises:

a decision unit, for determining a boundary corresponding to the display range according to the predetermined time; and a detection unit, coupled to the decision unit, for detecting whether the display range exceeds the boundary; wherein the processing device ignores any received update instruction for the display range before the display range exceeds the boundary.

20. An electronic map display system, comprising:

a storage device, for providing an electronic map file including a plurality of objects, each having an attribute; and a processing device, coupled to the storage device, for comparing a plurality of attributes corresponding to a plurality of target objects included within a display range to control a display order with respect to the target objects for displaying the target objects, wherein the processing device comprises:

a decision unit, for setting a boundary corresponding to the display range; and a detection unit, coupled to the decision unit, for detecting whether the display range exceeds the boundary; wherein the processing device ignores any received update instruction for the display range before the display range exceeds the boundary.

* * * * *